United States Patent Office 3,770,693
Patented Nov. 6, 1973

3,770,693
STABILIZATION OF POLYESTERURETHANES
WITH 2-IMINO-OXAZOLIDINES
Sidney H. Metzger, Pittsburgh, Pa., assignor to Baychem Corporation, New York, N.Y.
No Drawing. Original application Oct. 9, 1964, Ser. No. 402,951, now Patent No. 3,594,387. Divided and this application Dec. 1, 1970, Ser. No. 94,180
Int. Cl. C08g 51/60
U.S. Cl. 260—45.8 NZ    4 Claims

ABSTRACT OF THE DISCLOSURE

This invention relates to the use of 2-imino-oxazolidines, for the stabilization of polyester urethane compositions against hydrolysis.

---

This is a division of application Ser. No. 402,951, filed Oct. 9, 1964, now U.S. Pat. No. 3,594,387, and relates to 2-imino-oxazolidines, methods of preparation and to the stabilization of ester-containing compositions against hydrolysis.

It has been heretofore recognized in an article entitled "Anlagerungsreaktionen mit Epoxyden" by Klaus Gulbins and Karl Hamann, Berichte, vol. 94, page 3287 (1961) that the reaction of an epoxide or an alkylene carbonate with a carbodiimide should be expected to result in the formation of oxazolidines. This article however, points out that this is *not* the case; the imino-oxazolidines *do not result* because of being unstable and are converted immediately to cyclic ureas.

It is an object of this invention to provide new 2-imino-oxazolidines. It is another object of this invention to provide a method of preparing 2-imino-oxazolidines. It is another object of this invention to provide poly-2-imino-oxazolidines. It is another object of this invention to provide specific reaction conditions which prevent the immediate conversion of 2-imino-oxazolidines to cyclic ureas. It is still another object of this invention to provide a method of stabilizing ester containing compositions against hydrolysis. It is a further object of this invention to provide a method of stabilizing polyesters against hydrolysis. It is another object of this invention to provide polyesters stabilized against hydrolysis.

The foregoing objects and others which will become apparent from the following description are accomplished in accordance with the invention, generally speaking, by providing 2-imino-oxazolidines having the formula

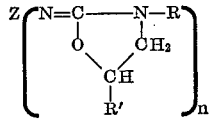

wherein Z is a radical obtained by removing at least one NCO group from an organic isocyanate, $n$ is an integer equal to the number of NCO groups removed from Z, R is an aryl, alkyl or cycloalkyl radical and R' is hydrogen or the residue remaining after removal of the 1,2-epoxide group or 1,2-carbonate group from a 1,2-epoxide or 1,2-carbonate respectively. When Z is a monovalent radical, it can be aryl, alkyl or cycloalkyl and may be the same or different from R. A method of preparation of the compounds shown in the formula above when Z is monovalent is to react an organic carbodiimide with either a 1,2-epoxide or a 1,2-alkylene carbonate at a temperature less than 220° C. for a period of time less than 3 hours in an inert solvent. When this method of preparation is used, Z and R are the same as the organic radical of the carbodiimide and R' is hydrogen or the residue remaining after removal of the 1,2-epoxide or 1,2-carbonate from a 1,2-epoxide or a 1,2-carbonate respectively. Thus, R' is hydrogen when either ethylene oxide or ethylene carbonate is used in the reaction with the carbodiimide and methyl when either 1,2-propylene oxide or 1,2-propylene carbonate is used. R' also represents the radical remaining after removal of the 1,2-epoxide group or 1,2-carbonate group from any suitable epoxide or carbonate such as, for example, 1,2-butylene carbonate, 1,2-octylene carbonate, 1,2-octadecylene carbonate, 1,2-butylene oxide, 1,2-amylene oxide, 1,2-octylene oxide, 1,2-octadecylene oxide, 3-ethyl-1,2-pentylene oxide, styrene oxide, phenyl glycidyl ether, allyl glycidyl ether, octadecyl glycidyl ether, amyl glycidyl ether, tolyl glycidyl ether, chlorophenyl glycidyl ether, naphthyl glycidyl ether and the like.

Z and R may be the same or different in the same molecule depending upon the particular carbodiimide used as the starting compound, such as, for example, aryl such as phenyl, α-naphthyl, β-naphthyl, α-anthryl, β-anthryl, gamma-anthryl; o-tolyl, m-tolyl, p-tolyl, 2,3-xylyl, 2,4-xylyl, 2,5-xylyl, 2,6-xylyl, 3,4-xylyl, 3,5-xylyl, o-cumenyl, m-cumenyl, p-cumenyl, mesityl, o-ethylphenyl, m-ethylphenyl, p-ethylphenyl, o-, m- and p-tertiary butylphenyl, 2,6-ditertiary butylphenyl, o-, m- and p-ethoxyphenyl, o-, m- and p-tert. butoxyphenyl and the like. Alkyl, such as, methyl, ethyl, n-propyl, isopropyl, n-butyl, isobutyl, sec-butyl, t-butyl, n-pentyl and various positional isomers thereof, such as, for example, 1-methylbutyl, 2-methyl-butyl, 3-methyl-butyl, 1,1-dimethylpropyl, 1,2-dimethylpropyl, 2,2-dimethylpropyl, 1-ethylpropyl and the like; corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like; cycloalkyl such as, cyclopropyl, cyclobutyl, cyclopentyl, cyclohexyl, o-, m- and p-isopropyl cyclohexyl, o-, m- and p-tert.-butyl cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclononadecyl, cycloeicosyl and the like.

In the preparation of the 2-imino-oxazolidines as represented by the formula above when Z is a monovalent, it is essential that the reaction between the epoxide or carbonate and the cadbodiimide be conducted in an inert solvent. While it is not essential, it is highly preferred that a suitable catalyst be used in carrying out this invention and that the reaction be maintained at a temperature less than 220° C. for a period of time less than three hours.

In practicing the invention, any suitable basic catalyst may be used to prepare imino-oxazolidines where Z is monovalent such as, for example, tertiary amines including N,N - dimethylaniline, 1 - methyl-4(dimethyl amino ethyl)piperazine, N-ethyl ethenylidine, N,N,N',N'-tetramethyl ethylene diamine, triethyl amine, 2,4,6-tri(dimethyl amino methyl)phenyl, N-ethyl morpholine, 2-methyl piperizine and the like; alkali metal hydroxides including sodium hydroxide, potassium hydroxide, lithium hydroxide and the like; tetramethyl ammonium bromide, tetraethyl ammonium bromide and the like. It is preferred that the tetraalkyl ammonium bromide catalysts be used.

Any suitable carbodiimide may be used in the practice of this invention to prepare 2-imino-oxazolidines such as, for example, diisopropyl carbodiimide,
dicyclohexyl carbodiimide,
methyl tertiary-butyl carbodiimide,
tertiary butyl phenyl carbodiimide,
tetramethylene-bis-diisobutyl carbodiimide,
N-dimethyl amino propyl tertiary butyl carbodiimide,
the monoglycol ether of hydroxyphenyl-tertiary butyl
  carbodiimides, diphenyl carbodiimide,
dinaphthyl carbodiimide,
2,2'-dimethyl diphenyl carbodiimide,
2,2'-diisopropyl-diphenyl carbodiimide,
2-dodecyl-2'-n-propyl-diphenyl carbodiimide,
2,2'-diethoxy-diphenyl carbodiimide,
2-dodecyl-2'-ethyl-diphenyl carbodiimide,
2,2'-dichloro-diphenyl carbodiimide,
2,2'-ditolyl-diphenyl carbodiimide,
2,2'-dibenzyl-diphenyl carbodiimide,
2,2'-dinitrodiphenyl carbodiimide,
2-ethyl-2'-isopropyl-diphenyl carbodiimide,
2,6,2',6'-tetraethyl-diphenyl carbodiimide,
2,6,2',6'-tetrasecondary-butyl-diphenyl carbodiimide,
2,6,2',6'-tetraethyl-3,3'-dichloro-diphenyl carbodiimide,
2,6,2',6'-tetraisopropyl-3,3'-dinitro-diphenyl carbodiimide,
2-ethyl-cyclohexyl-2-isopropyl-phenyl carbodiimide,
2,4,6,2',4',6'-hexaisopropyl-diphenyl carbodiimide,
2,2'-diethyl-dicyclohexyl carbodiimide,
2,6,2',6'-tetraisopropyl-dicyclohexyl carbodiimide,
2,6,2',6'-tetraisopropyl dicyclohexyl carbodiimide,
2,6,2',6'-tetraethyl-dicyclohexyl carbodiimide, and
2,2'-dichloro-dicyclohexyl carbodiimide,
2,2'-dicarbethoxy diphenyl carbodiimide,
2,2'-dicyano-diphenyl carbodiimide and the like. Any suitable carbodiimide having more than one carbodiimide group may also be used such as those described in U.S. Pat. 2,941,966.

Any suitable inert solvent can be used as the medium in which the reaction is conducted such as, for example, dioxane, heptane, toluene, benzene, tetrahydrofuran, dimethylformamide, dimethylacetamide, dialkylcellosolves, dialkylcarbitols and the like.

In the preparation of the 2-imino-oxazolidines the epoxide or carbonate is used in equivalent proportions or in excess of the quantity of the carbodiimide used. The materials are inserted into a reaction vessel which contains a suitable solvent medium. The reaction vessel is heated to a temperature of from about 200 to about 220° C. where it is maintained for about one to about three hours. The reaction mass is then cooled and the product is separated by standard techniques such as crystallization or distillation. If desired, a suitable catalyst is also added to the reaction vessel.

The compounds having the formula set forth above can be prepared by an interchange reaction whereby a different organic radical is substituted for Z. This is accomplished by reacting an organic isocyanate with a 2-imino-oxazolidine. This reaction takes place in accordance with the following general equation:

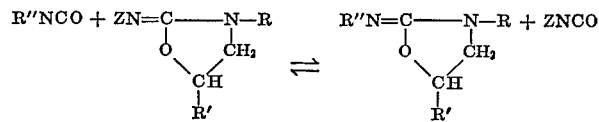

An equilibrium is established and in order to drive the reaction to the right, the isocyanate formed, that is, ZNCO is removed substantially as soon as it is formed. This can be accomplished by distillation.

When polyisocyanates are used, the interchange reaction will take place at one or more of the NCO groups present of the polyisocyanate depending upon the amount of the 2-imino-oxazolidine present in the reaction mixture. The polyimino-oxazolidines may also be used and can be prepared by this same technique. In the interchange reaction, the materials are heated to a temperature of from about 50° C. to about 220° C. at either atmospheric pressure or in a partial vacuum. The isocyanate formed is substantially immediately removed from the reaction mixture by a suitable arranged distillation column.

Any suitable organic isocyanate can be used in the interchange recation with the mono or poly 2-iminooxazolidines such as, for example, tetramethyle diisocyanate,
hexamehtylene diisocyanate,
1,4-phenylene diisocyanate,
1,3-phenylene diisocyanate,
1,4-cyclohexylene diisocyanate,
2,4-tolylene diisocyanate,
2,5-tolylene diisocyanate,
2,6-tolylene diisocyanate,
3,5-tolylene diisocyanate,
4-chloro-1,3-phenylene diisocyanate,
1-methoxy-2,4-phenylene diisocyanate,
1-methyl-3,5-diethyl-2,6-phenylene diisocyanate,
1,3,5-triethyl-2,4-phenylene diisocyanate,
1-methyl-3,5-diethyl-2,4-phenylene diisocyanate,
1-methyl-3,5-diethyl-6-chloro-2,4-phenylene diisocyanate,
6-methyl-2,4-diethyl-5-nitro-1,3-phenylene diisocyanate,
p-xylylene diisocyanate,
m-xylylene diisocyanate,
4,6-dimethyl-1,3-xylylene diisocyanate,
1,3-dimethyl-4,6-bis($\beta$-isocyanatoethyl)benzene,
3-($\alpha$-isocyanatoethyl)phenylisocyanate,
1-methyl-2,4-cyclohexylene diisocyanate,
4,4'-biphenylene diisocyanate,
3,3'-dimethyl-4,4'-biphenylene diisocyanate,
3,3'-dimethoxy-4,4'-biphenylene diisocyanate,
3,3'-diethoxy-4,4'-biphenylene diisocyanate,
1,1'-bis-(4-isocyanatophenyl)cyclohexane,
4,4'-diisocyanatodiphenylether,
4,4'-diisocyanato-dicyclohexylmethane,
4,4'-diisocyanato-diphenylmethane,
4,4'-diisocyanato-3,3'-dimethyldiphenylmethane,
4,4'-diisocyanato-3,3'-dichlorodiphenylmethane,
4,4'-diisocyanato-diphenyldimethylmethane,
1,5-naphthylene diisocyanate,
4,4',4''-triisocyanato-triphenylmethane,
2,4,4'-triisocyanatodiphenylether,
2,4,6-triisocyanato-1-methyl-3,5-diethylbenzene,
o,o,o-tris(4-isocyanatophenyl)phosphorothioate and the like; methyl isocyanate, ethyl isocyanate, propyl isocyanate, isopropyl isocyanate, allyl isocyanate, butyl isocyanate, isobutyl isocyanate, sec.-butyl isocyanate, tert.-butyl isocyanate, amyl isocyanate, 3-methoxypropyl isocyanate, tetradecyl isocyanate, chlorodecyl isocyante, 4-oxa-hexadecyl isocyanate, 4-oxa-6-butyldodecyl isocyanate, dodecyl isocyanate, hexadecyl isocyanate, octadecyl isocyanate, 1-isocyanato-octadecene-9, phenyl isocyanate, cyclohexyl isocyanate, o-chlorophenyl isocyanate, m-chlorophenyl isocyanate, p-chlorophenyl isocyanate, o-toluyl isocyanate, m-toluyl isocyanate, p-toluyl isocyanate, o-ethylphenyl isocyanate, o-ethoxyphenyl isocyanate, p-ethoxyphenyl isocyanate, o-nitrophenyl isocyanate, m-nitrophenyl isocyanate, p-nitrophenyl isocyanate, 1-isocyanato-3-benzalacetophenone, 1-isocyanatosulfonyl-4-methylbenzene, benzyl isocyanate, m-isocyanato-cinnamic-acid-ethylester, 2,4-dichlorophenyl isocyanate, 3,4 - dichlorophenyl isocyanate, 2,5-dichlorophenyl isocyanate, $\alpha$-naphthyl isocyanate, $\beta$-naphthyl isocyanate, 5-hydroxy-$\alpha$-naphthyl isocyanate, 5 - isocyanato-$\alpha$-naphthylchloroformate, o-biphenyl isocyanate, o-phenoxyphenyl isocyanate, 3-nitro-4-chlorophenyl isocyanate, and the like.

The 2-imino-oxazolidines are particularly useful in the stabilization of ester containing compositions. In the event that the ester or polyester is used in further reactions with other compounds such as, for example, the reaction with an organic polyisocyanate to prepare polyurethanes, the 2-imino-oxazolidines can also be added after this reaction takes place. The addition can be made with the oxazolidines in the dissolved state by rolling, milling, stirring or any suitable technique.

Any composition containing ester linkages

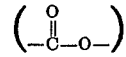

may be stabilized against hydrolytic degradation in accordance with this invention such as, for example, the reaction product of a carboxylic acid with an alcohol. Any suitable carboxylic acid may be used in the preparation of compositions containing ester groups in accordance with this invention such as, for example, acetic acid, propionic acid, phenyl acetic acid, benzoyl acetic acid, pyruvic acid, propionyl acetic acid, butyryl formic acid, aceto butyric acid, levulinic acid, 1,2-keto stearic acid, 1,3-keto behenic acid, aldovaleric acid, hexahydrobenzoic acid, 1,2-cyclohexanone carboxylic acid, brassylic acid, phenylmalonic acid, ethylglycollic acid, thiodiglycolic acid, $\beta$-chloropropionic acid, glutaconic acid, ethoxymalonic acid, malic acid, aspartic acid, acrylic acid, methacrylic acid, cinnamic acid, benzene tricarboxylic acid, adipic acid, succinic acid, suberic acid, sebacic acid, oxalic acid, methyl-adipic acid, glutaric acid, pimelic acid, azelaic acid, phthalic acid, terephthalic acid, isophthalic acid, thiodipropionic acid, maleic acid, fumaric acid, citraconic acid, itaconic acid and the like.

Any suitable alcohol may be used in the preparation of esters such as, for example, methyl alcohol, ethyl alcohol, propyl alcohol, isopropyl alcohol, n-butyl alcohol, isobutyl alcohol, secondary butyl alcohol, tertiary butyl alcohol, amyl alcohol, hexyl alcohol, octyl alcohol, decyl alcohol, lauryl alcohol, myristyl alcohol, cetyl alcohol, stearyl alcohol, allyl alcohol, methallyl alcohol, crotyl alcohol, 2-propyn-1-ol, oleyl alcohol, geraniol, citronellol, linalool, diacetone alcohol, ethylene glycol monoethyl ether, cyclohexanol, naphthenic alcohols, benzyl alcohol, tolyl alcohol, phenylethyl alcohol, octadecylbenzyl alcohol, ethyelne glycol, propylene glycol, 1,4-butanediol, 1,3-butanediol, 1,5-pentanediol, 1,6 - hexanediol, bis-(hydroxy methyl cyclohexane), diethylene glycol, 2,2-dimethyl propylene glycol, 1,3,6-hexanetriol trimethylol propane, pentaerythritol, sorbitol, glycerine and the like. The method of stabilizing compositions containing ester groups is applicable not only to monoesters but also to polyesters in accordance with the compounds listed above having a functionality greater than 1. For example, where any of the di- or polycarboxylic acids are reacted with the di- or polyhydric alcohols, a polyester having more than one ester group, of course, will result.

Of course, other compositions containing polyester resins as a reaction component or in admixture can also be stabilized by the process of this invention. For example, compositions such as polyester amides and polyester urethanes can be stabilized. The reaction product of any of the carboxy terminated or hydroxyl terminated esters set forth above can be reacted with a suitable isocyanate to prepare a polyurethane. In the preparation of polyester amides, the reaction of a carboxylic acid, an alcohol and an amine can be carried out simultaneously or in steps in the manner set forth for the preparation of polyesteramides. Of course, aminoalcohols and aminoacids can be used in the preparation of polyesteramides. The pertinent feature is, however, that any composition containing ester groups can be stabilized against hydrolysis by the introduction thereof of an oxazolidine within the formula set forth above.

Any suitable organic polyisocyanate may be used to prepare polyester urethanes which may be stabilized in accordance with this invention such as, for example, those more particularly set forth above.

Any suitable amino compound can be used to prepare polyesteramides such as, for example, hexamethylene diamine, ethylene diamine, propylene diamine, butylene diamine, cyclohexylene diamine, phenylene diamine, tolylene diamine, xylylene diamine, 4,4'-diamino-diphenylmethane, naphthylene diamine, aminoethyl alcohol, aminopropyl alcohol, aminobutyl alcohol, aminobenzyl alcohol, aminoacetate acid, aminopropionic acid, aminobutyric acid, aminovaleric acid, aminophthalic acid, aminobenzoic acid and the like. Of course, the amino compounds may be reacted either simultaneously with the ester forming components or sequentially therewith.

It is also within the scope of the invention that naturally occurring esters may be stabilized against hydrolysis and aging in accordance with this invention such as, for example, castor oil, cocoanut oil, corn oil, cottonseed oil, horse fat oil, lard oil, wool fat, Japan wax, mutton tallow, beef tallow, neat's foot oil, palm oil, peanut oil, carnauba wax, seprmaceti, beeswax, rapeseed oil, soya bean oil, whale oil, sperm oil and the like. Futher, any compositions containing ester groups as well as unsaturation may be stabilized in accordance with this invention. Such compositions may be formed by polymerization, condensation or a combination of both. Any of those unsaturated carboxylic acids mentioned above may be used in the preparation of such polyesters. Further examples of such compositions include polyester resins of polymerizable monomers an dunsaturated polyesters, for example, those of fumaric or maleic acid as well as ethylene vinyl ester copolymers, acrylic and methacrylic acid ester polymers and their copolymers with vinyl esters, fluorinated acrylic esters and their copolyemrs, copolymers of acrylonitrile and acrylic acid esters such as methylacrylate and the like. The invention is particularly applicable to the stabilization of polyesters used in the manufacture of synthetic resins which may result in the form of lacquers, foils and coatings, fibers, foam materials, elastomers or casting resins for molded elements.

Any of the 2-imino-oxazolidines within the generic formula set forth above may be used to stabilize any of the polyester compositions set forth. The oxazolidines should be used in a stabilizing amount, however, it is preferred that from about 0.1 to about 10 parts per 100 parts of a polyester be used.

The oxazolidines may be incorporated into the polyester by any suitable technique which includes dry blending, dissolving in the polyester itself, dissolving in a co-reactant before reaction with the polyester and the like.

The invention is further illustrated but not limited by the following examples in which parts are by weight unless otherwise specified.

EXAMPLE 1

Preparation of 3-phenyl-2-phenylimino oxazolidines

To a one-liter stirred autoclave is charged about 145.0 parts (0.75 mol) of diphenyl-carbodiimide, a solution of about 53.1 parts (1.2 mols) of ethylene oxide in about 250 parts by volume of dry dioxane and about 3.0 parts of tetraethylammonium bromide. The mixture is heated with stirring at about 200 to about 212° C. for approximately 75 minutes. A pressure drop of about 40 p.s.i. is observed. After cooling, a total of 130.0 parts of solid is recovered from the dioxane solution. The 3-phenyl-2-phenylimino oxazolidine is separated by fractional crystallization and melts at 115° C. The infrared spectrum of the oxazolidine shows a strong absorbance of 1205 cm.$^{-1}$ characteristics of the C—O stretch which is not present in the specrtum of the cyclic urea.

Oxazolidine Analysis.—Calculated (percent): C, 75.61; H, 5.88; N, 11.76. Found (percent): C, 75.98; H, 5.86; N, 11.66.

EXAMPLE 2

To a one-liter stirred autoclave is charged about 145.2 parts (0.75 mol) of diphenylcarbodiimide, about 75.0 parts (1.3 mol) of propylene oxide, about 300 parts by volume of dioxane and about 3.00 parts of tetraethylammonium bromide. The reaction mixture is stirred at about 200-204° C. for about one hour and 15 minutes. After cooling, excess propylene oxide and dioxane are removed by stripping in vacuo, leaving about 163 parts of a brown oil as residue. Unreacted carbodiimide is removed by dispersing the sludge in boiling hexane and removing the carbodiimide as a solution in the hexane layer. The infrared spectrum of the semi-soild clearly shows the —C=N—, C—H of alkyl and —C—O— vibrations of the 2-phenylimino-3-phenyl-5-methyloxazolidine.

EXAMPLE 3

To a one-liter stirred autoclave is added about 70.5 parts (0.25 mol) of bis(4-ethoxyphenyl)carbodiimide, about 1.02 parts of tetraethylammonium bromide and about 250 parts by volume of dioxane. The autoclave is purged with nitrogen and then about 21.5 parts (0.489 mol) of ethylene oxide is pressured in. The reaction is conducted at about 190° to about 208° C. for approximately 135 minutes. A pressure drop of 35–40 p.s.i. is observed. Upon cooling, 36.3 parts of solid (plates) crystallizes.

After stripping the dioxane from the remaining solution 57.2 parts of solid is left. From this dark solid by repeated recrystallizations from isopropanol, there is obtained the desired oxazolidine of the following structure:

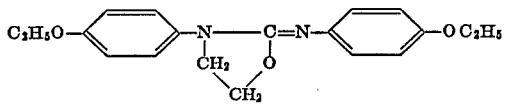

EXAMPLE 4

Stabilization of a polyester

About 1 part of the product of Example 1 is dissolved in about 100 parts of a hydroxyl poleyster having a molecular weight of about 2000 and an hydroxyl number of about 57 which is prepared by reacting adipic acid with diethylene glycol and trimethylol propane. About 10 parts of an isomeric mixture of 80% 2,4- and 20% 2,6-tolylene diisocyanate is stirred into this mixture and this reaction mixture is then cast onto a Teflon coated tray to a thickness of about ⅛ inch where it is permitted to remain for about 2 hours at about 110° C.

Identical samples are prepared without the addition of the product of Example 1. Samples having the additive and those without the additive are placed on a wire screen over a steam bath at 100° C. The unmodified samples soften after 72 hours and completely failed after 105 hours. Those containing the additive in accordance with this invention do not soften until 144 hours of exposure.

EXAMPLE 5

To about 150 parts of the polyester of Example 4 are added 1.35 parts of a compound having the formula

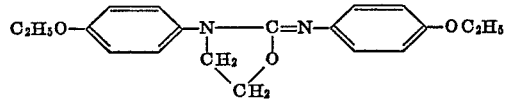

About 100 parts of this mixture are reacted with about 10 parts of an isomeric mixture of 80% 2,4- and 20% 2,6-tolylene diisocyanate. The reaction mixture, which is one typically used in the preparation of printing rollers, is cast into a test sample. The test sample is subjected to saturated steam at 100° C. This sample failed after 144 hours. In comparison, a similar sample containing none of the additive set forth above failed after 96 hours.

EXAMPLE 6

The procedure of Example 5 is followed with the exception that 4.05 parts of the compound having the formula represented are added to the polyester in place of the 1.35 parts of Example 5. The test sample prepared using this stabilized polyester exhibits no signs of failure even after 144 hours on a steam bath.

EXAMPLE 7

Preparation of:

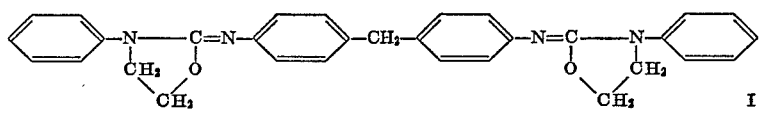

To a boiling flask equipped with a thermometer and a distillation head is charged about 11.9 parts (0.05 mol) of 3-phenyl-2-phenylimino-oxazolidine and about 6.3 parts (0.025 mol) of 4,4'-diisocyanatodiphenylmethane. The mixture is heated to from about 75 to about 127° C. at about 6.0 mm. Hg vacuum, during which time a low boiling liquid distills and is collected. After about 15 minutes heating, the reaction mixture solidifies and traps some low-boiling liquid beneath the solid mass. The reaction is completed by heating the solid mass to from about 127 to about 145° C. while gradually lowering the pressure until about 1 mm. Hg is reached. The collected distillate weighs about 4.0 parts and is shown to be pure phenylisocyanate. The residual solid is recrystallized from dioxane to remove trapped phenylisocyanate. Weight of recrystallized white solid is about 10.4 parts M.P. 216–18° C. The infrared spectrum, with absorbancies at 1675 cm.$^{-1}$ (C=N) and 1205 cm.$^{-1}$ (C—O), definitely identifies the product as I.

EXAMPLE 8

Preparation of:

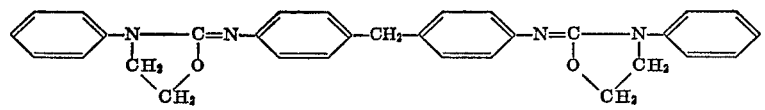

In a 3-necked flask equipped with a thermometer and mechanical stirrer, and to which is attached a 10 inch heated distillation column packed with glass helices is charged about 47.6 parts (0.2 mol) of 3-phenyl-2-phenyl-imino-oxazolidine, about 25.0 parts (0.1 mol) of 4,4'-diisocyanatodiphenylmethane and about 100 parts by volume of Decalin (dried over sodium). The solution is heated to boiling in vacuo and the pressure is gradually raised to continually increase the boiling temperature. Initial conditions are about 80° C. at about 15 mm. Hg; final conditions are about 126° C. above 100 mm. Hg. Total reaction time is about three hours. Phenylisocyanate, along with Decalin, is continually removed as it is formed. As the reaction progresses, Compound I begins to crystallize. At the conclusion of the reaction, the white solid is removed by filtration, washed with petroleum ether and dried. Weight of product is about 45.5 parts or 93.2% of theory. The crude solid melts at 212–218° C.

Preparation of

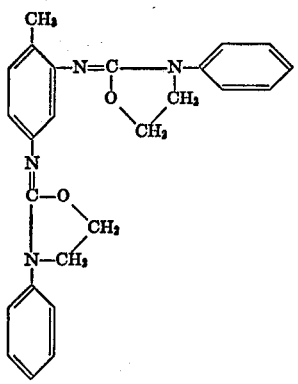

II

In the same equipment as Example 8 is charged about 38.1 parts (0.16 mol) of 3-phenyl-2-phenylimino-oxazolidine, about 13.95 parts (0.08 mol) of 2,4-toluene diisocyanate and about 100 parts by volume of Decalin (dried over sodium). The mixture is boiled in vacuo while gradually increasing pressure until a boiling point of about 136° C. is reached. Phenylisocyanate, along with Decalin, is removed as it is formed. The product oils out and solidifies upon cooling. It is broken up and filtered giving an almost quantitative yield of II.

EXAMPLE 10

Preparation of:

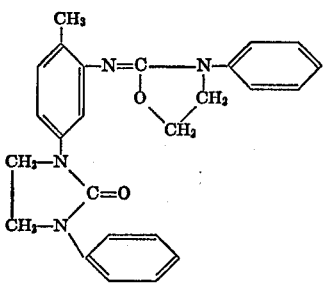

III

The product (II) from Example 9 is put into Decalin and heated approximately two hours at from about 145 to about 150° C. Compound III oils out and solidifies upon cooling. Recrystallization from acetone gives a light tan solid M.P. 178–80° C. The infrared spectrum of the product (III) showed a doublet of about equal intensities at 1710 cm.$^{-1}$ (C=O of urea) and 1675 cm.$^{-1}$ (C=N of imino-oxazolidine), C—O stretch at 1205 cm.$^{-1}$ and aliphatic C—N at 1230 cm.$^{-1}$, typical of the C—N in imidazolidinones.

EXAMPLE 11

To about 100 parts of the polyester of Example 4 are added the amounts of the compounds indicated in the accompanying table. This mixture is then reacted with 10 parts of an isomeric mixture of 80% 2,4- and 20% 2,6-tolylene diisocyanate to prepare a typical printing roller formulation. The reaction mixture is then cast onto a plate and then the solidified material is subjected to saturated steam at about 100° C. for the time indicated in the table.

| Compound of Example No. | Parts | Hours to failure |
| --- | --- | --- |
| 7 | 0.669 | 114 |
| 7 | 2.007 | 216 |
| 10 | 1.10 | 168 |
| Control (no additive) | | 96 |

EXAMPLE 12

The procedure of Example 4 is followed with the exception that a compound indicated in the following table is added to the polyester in the amounts set forth. The casting in each case is then subjected to saturated steam at 100° C. until failure. The compounds added have the general formula:

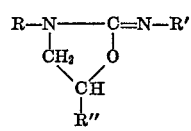

The values for R, R' and R" are indicated in the table

| R, R' | R" | Parts | Hours to failure |
| --- | --- | --- | --- |
| C$_6$H$_5$— | H | 0.658 | 114 |
| C$_6$H$_5$— | H | 1.974 | 240 |
| C$_6$H$_5$— | CH$_3$ | 1.00 | 130 |
| P-EtoC$_6$H$_4$— | H | 0.934 | 144 |
| Control (no additive) | | | 96 | in order to specifically identify the compounds used.

EXAMPLE 13

To about 100 parts of an hydroxyl terminated polyester prepared by reacting 10 mols of adipic acid and 11 mols of 1,4-butanediol to an hydroxyl number of 56 and an acid number less than one are added 9 parts of 1,4-butanediol and about 40 parts of 4,4'-diphenylmethane diisocyanate. The reaction mixture is immediately cast onto a heated plate maintained at a temperature of about 110° C. where it is permitted to solidify. Upon solidification, the material is removed from the plate and tested for elongation, elongation set, tensile and tear strength. The sample is then subjected to steam at 15 lbs./sq. inch gauge for a period of 16 hours and then, the samples are again tested. To each of three 100 part samples of the polyester reacted as above, are added the quantities of Compound I of Example 7 indicated in the attached table. The test data both before and after the steam test are set forth.

| Parts/100 parts polyester | Elongation | | Elongation set | | Tensile | | Tear | |
| --- | --- | --- | --- | --- | --- | --- | --- | --- |
| | Before | After | Before | After | Before | After | Before | After |
| | 500 | 560 | 10 | 140 | 7,890 | 3,560 | 245 | 220 |
| 0.67 | 490 | 560 | 10 | 77 | 7,680 | 4,270 | 216 | 277 |
| 1.349 | 500 | 600 | 20 | 115 | 7,620 | 4,280 | 288 | 261 |
| 2.02 | 540 | 600 | 40 | 117 | 8,000 | 4,260 | 295 | 214 |

It is of course to be understood that any of the 2-imino-oxazolidines mentioned above may be used in the stabilization of any of the polyesters set forth above. Also, any of the carbodiimides may be used in the preparation of oxazolidine in accordance with this invention and may be substituted into the examples for those specifically set forth therein.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A polyester-urethane having incorporated therein a stabilizing amount of a 2-imino-oxazolidine having the formula

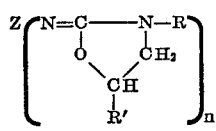

wherein Z is a radical obtained by removing at least one NCO group from a monomeric organic mono-, di-, or tri-isocyanate, optionally substituted with chloro, nitro, alkoxy, sulphonyl, aryloxy, carbonyl or ester groups, R is a radical selected from the group consisting of aryl, alkyl and cycloalkyl and R' is selected from the group consisting of hydrogen, the radical remaining after removal of the epoxide group from a 1,2-epoxide and the radical reamining after removal of the 1,2-carbonate group from a 1,2-carbonate, and n is an integer corresponding to the number of NCO groups removed from the radical Z.

2. A polyester urethane having incorporated therein a stabilizing amount of a compound having the formula

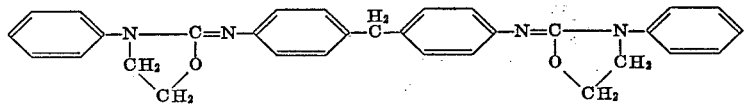

3. A polyester urethane having incorporated therein a stabilizing amount of a compound having the formula

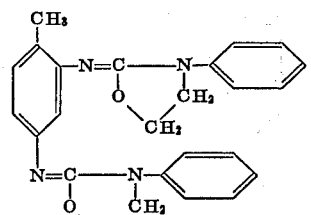

4. A polyester urethane having incorporated therein a stabilizing amount of a compound having the formula

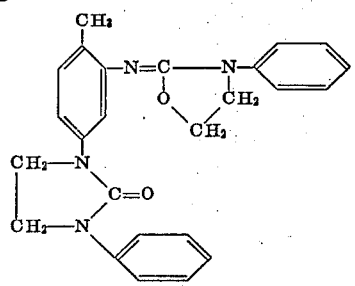

References Cited
UNITED STATES PATENTS

| | | | |
|---|---|---|---|
| 3,193,523 | 7/1965 | Neumann et al. | 260—45.9 |
| 3,594,387 | 7/1971 | Metzger | 260—307 |
| 3,640,952 | 2/1972 | Metzger, Jr. | 260—45.8 |

DONALD E. CZAJA, Primary Examiner

R. A. WHITE, Assistant Examiner

U.S. Cl. X.R.

260—77.5 SS